United States Patent [19]
Nijzingh et al.

[11] Patent Number: 5,524,530
[45] Date of Patent: Jun. 11, 1996

[54] KITCHEN MACHINE WITH PROTECTED ROTATABLE BOWL

[75] Inventors: Johan R. Nijzingh; Adam Weits, both of Hoogeveen, Netherlands

[73] Assignee: U.S. Philips Corporation, New York, N.Y.

[21] Appl. No.: 386,905

[22] Filed: Feb. 7, 1995

[30] Foreign Application Priority Data

Feb. 7, 1994 [EP] European Pat. Off. ............ 94200228

[51] Int. Cl.⁶ .......................... A47J 44/00; A47J 44/02; B01F 9/00; B01F 9/08
[52] U.S. Cl. .................... 99/492; 99/348; 99/484; 99/511; 241/37.5; 241/92; 366/199; 366/200; 366/206; 366/224; 366/314; 366/601
[58] Field of Search ........................... 99/492, 509–511, 99/512, 513, 348; 241/37.5, 92; 366/199, 200, 201, 206, 224, 314, 601

[56] References Cited

U.S. PATENT DOCUMENTS

| | | | |
|---|---|---|---|
| 2,075,851 | 4/1937 | Johnston | 366/200 |
| 3,170,674 | 2/1965 | Gomersall et al. | 366/200 |
| 3,752,057 | 8/1973 | Groen, Jr. | 99/348 |
| 3,904,178 | 9/1975 | Scott et al. | 366/199 |
| 3,951,351 | 4/1976 | Ernster et al. | 241/282.1 |
| 4,325,643 | 4/1982 | Scott et al. | 366/224 |
| 4,403,867 | 9/1983 | Duke | 366/601 |
| 5,353,697 | 10/1994 | Venturati et al. | 99/492 |
| 5,355,784 | 10/1994 | Franklin et al. | 99/511 |
| 5,380,086 | 1/1995 | Dickson | 99/348 |
| 5,392,699 | 2/1995 | Tai | 99/513 |
| 5,417,152 | 5/1995 | Harrison | 99/511 |

FOREIGN PATENT DOCUMENTS

2600399  7/1976  Germany.

*Primary Examiner*—Timothy F. Simone
*Attorney, Agent, or Firm*—Ernestine C. Bartlett

[57] ABSTRACT

A kitchen machine is provided with a base (3) and a motor housing (5) which is arranged on the base (3) and in which an electric motor (27) is accommodated. On the base (3) next to the motor housing (5), an open bowl (9) can be placed, journalled relative to the base (3). A transverse arm (17) can be coupled on the motor housing (5), which arm extends to above the bowl (9). A tool (19) can be placed in the bowl (9) and can be coupled to a transmission (25) which is arranged in the transverse arm (17) and can be driven by the electric motor (27). The bowl (9) can be driven into rotation by a pinion (21) which is also coupled to the transmission (25). The pinion (21) is displaceable along its axis of rotation relative to the transverse arm (17) and is displaced from a first into a second position through engagement with a toothed rim (23) of the bowl (9) when the transverse arm (17) is placed on the motor housing (,5). In the first position of the pinion (21), a rotary switch (69) is blocked in its zero position by a blocking mechanism (71) coupled to the pinion (21), so that the electric motor (27) cannot be switched on, whereas the rotary switch (69) is released by the blocking mechanism (71) with the pinion (21) in the second position when the transverse arm (17) is locked to the motor housing (5) by a locking mechanism (117). The kitchen machine can thus only be switched on when both the bowl (9) and the transverse arm (17) have been correctly positioned, so that the possibility of injury of a user of the kitchen machine with the rotating parts of the kitchen machine is substantially elminated.

20 Claims, 8 Drawing Sheets

KITCHEN MACHINE WITH PROTECTED ROTATABLE BOWL

FIELD OF THE INVENTION

The invention relates to a kitchen machine provided with a housing, a bowl which is placeable on the housing and which is rotatably guided relative to the housing, and a transverse arm which is displaceable relative to the housing, wherein a tool can be placed in the bowl and can be coupled to a transmission arranged in the transverse arm and driven by an electric motor, and the bowl can be driven by a drive wheel driven by the electric motor and cooperating with a circumference of the bowl.

BACKGROUND OF THE INVENTION

A kitchen machine of the kind mentioned in the opening paragraph is known from German Patent 26 00 399. The housing of the known kitchen machine comprises a base and a column positioned on the base. The bowl can be placed on the base next to the column and has its rotation bearings on the base. A transverse arm is provided on the column, extending to above the bowl with pivoting possibility relative to the column. The transmission arranged in the transverse arm can be driven by the electric motor of a handmixer which is a part of to the kitchen machine and which can be placed on the transverse arm, in which position an output shaft of the handmixer is coupled to the transmission. The drive wheel is a pinion which is in engagement with a toothed rim provided along an outer circumference of the bowl and which is coupled to the transmission. During operation, the tool rotates at a comparatively high speed relative to the bowl, while the bowl rotates at a comparatively low speed relative to the base.

A disadvantage of the known kitchen machine is that the electric motor can be switched on while the rotatable bowl is absent or is incorrectly placed on the base. If the bowl has not been placed on the base, a user of the kitchen machine may readily injure himself or herself with the rotating tool. If the bowl has been incorrectly placed on the base the pinion will not engage the toothed rim of the bowl, so that the kitchen machine will function incorrectly.

SUMMARY OF THE INVENTION

An object of the invention is to provide a kitchen machine of the kind mentioned in the opening paragraph whose electric motor cannot be switched on when the rotatable bowl has not been placed on the base or has been incorrectly placed, so that the above disadvantages are avoided as much as possible.

The invention is for this purpose characterized in that the drive wheel is displaceably guided along its axis of rotation relative to the transverse arm between a first position and a second position, the drive wheel being displaceable from the first position into the second position through engagement with the bowl when the transverse arm is placed on the housing, while a blocking mechanism cooperating with the drive wheel blocks a switch of the electric motor in the first position of the drive wheel and releases it in the second position of the drive wheel. As a result of the use of the drive wheel which is displaceable along its axis of rotation and which cooperates with the blocking mechanism, the electric motor cannot be switched on when the bowl is not placed on the housing or is not placed correctly on the housing, in which cases the drive wheel does not come into engagement with the bowl. Since the drive wheel itself is used as a mechanical link between the blocking mechanism and the bowl, a simple and effective construction of the kitchen machine is provided in which the number of components is minimized.

A special embodiment of a kitchen machine according to the invention, in which the drive wheel is a pinion which is to cooperate with a toothed rim provided along the circumference of the bowl, is characterized in that the pinion is provided with a collar which comes into pressure contact with a flank of the toothed rim when the transverse arm is placed on the housing. Since the collar of the pinion comes into pressure contact with the flank of the toothed rim when the transverse arm is placed on the housing, the pinion is displaced along its axis of rotation, so that the blocking mechanism releases the switch of the electric motor.

A further embodiment of a kitchen machine according to the invention which provides a reliable and easy to construct transmission between the rotatable and displaceable drive wheel and the blocking mechanism is characterized in that the drive wheel is provided with a slot along a circumference, which slot is in engagement with a fork belonging to a slide which is displaceable parallel to the axis of rotation of the drive wheel and is provided with a blocking stud which cooperates with the blocking mechanism.

A yet further embodiment of a kitchen machine according to the invention is characterized in that the transverse arm is provided with a locking mechanism which cooperates with the blocking mechanism and the displaceable drive wheel and which is displaceable from a first position, in which the transverse arm is unlocked from the housing, into a second position, in which the transverse arm is locked relative to the housing, the blocking mechanism blocking the switch of the electric motor in the first position of the locking mechanism and releasing it in the second position of the locking mechanism, while the drive wheel enables the second position of the locking mechanism only if the drive wheel is in the second position. The use of the locking mechanism cooperating with the blocking mechanism and the displaceable drive wheel achieves that the electric motor can only be switched on when both the bowl and the transverse arm have been correctly placed relative to the housing.

A particular embodiment of a kitchen machine according to the invention is characterized in that the locking mechanism comprises a rotatable locking disc which is provided with studs which cooperate with mating slots in the housing. The use of said locking disc provides a rigid, stable locking of the transverse arm relative to the housing which can be achieved by a simple rotary movement.

A further embodiment of a kitchen machine according to the invention is characterized in that the transverse arm is pivotable relative to a coupling piece which comprises the locking mechanism and with which the transverse arm can be locked relative to the housing, while a hook belonging to the locking mechanism locks the transverse arm relative to the coupling piece in the first and second position of the locking mechanism, and releases the transverse arm relative to the coupling piece in an intermediate position of the locking mechanism which lies between the first and the second position. The pivoting possibility of the transverse arm relative to the coupling piece renders it possible to exchange or clean the tool without disengaging the transverse arm from the housing.

A still further embodiment of a kitchen machine according to the invention is characterized in that the blocking mechanism cooperating with the locking mechanism blocks the switch in the intermediate position of the locking mechanism. As a result, a user of the kitchen machine cannot be injured with the rotating tool when the transverse arm has been pivoted relative to the housing.

A special embodiment of a kitchen machine according to the invention is characterized in that the pivotable transverse arm cooperates with a further blocking element which blocks the locking mechanism in the intermediate position when the transverse arm is pivoted relative to the coupling piece. The use of the further blocking element prevents the transverse arm from being detached from the housing when the transverse arm has been pivoted relative to the housing. In addition, the locking mechanism is not displaceable into the second position, in which the switch of the electric motor can be switched on, in the case of a correctly positioned bowl and a transverse arm which is pivoted relative to the housing.

A further embodiment of a kitchen machine according to the invention, in which the further blocking element is constructed in a simple and effective manner, is characterized in that the further blocking element is a wire spring which is elastically deformed by the transverse arm and releases the locking mechanism when the transverse arm is locked relative to the coupling piece, whereas the wire spring is released and blocks the locking mechanism in the intermediate position when the transverse arm is pivoted relative to the coupling piece.

A yet further embodiment of a kitchen machine according to the invention is characterized in that the blocking mechanism blocks the locking mechanism in the second position when the electric motor has been switched on by means of the switch. As a result the transverse arm cannot be pivoted relative to the housing or detached therefrom through a displacement of the locking mechanism into the intermediate position or first position while the electric motor is switched on.

BRIEF DESCRIPTION OF THE DRAWINGS

The invention will be explained in more detail below with reference to the drawing in which FIG. 1a diagrammatically shows a kitchen machine according to the invention with a rotatable open bowl and a transverse arm, FIG. 6b shows a second position of the pinion of FIG. 6a, FIG. 7a shows a first position of a locking mechanism of the transverse arm of the kitchen machine of FIG. 1a, FIG. 7b shows an intermediate position of the locking mechanism of FIG. 7a, and FIG. 7c shows a second position of the locking mechanism of FIG. 7a.

DETAILED DESCRIPTION OF THE PREFERRED EMBODIMENTS

Figure 1A:
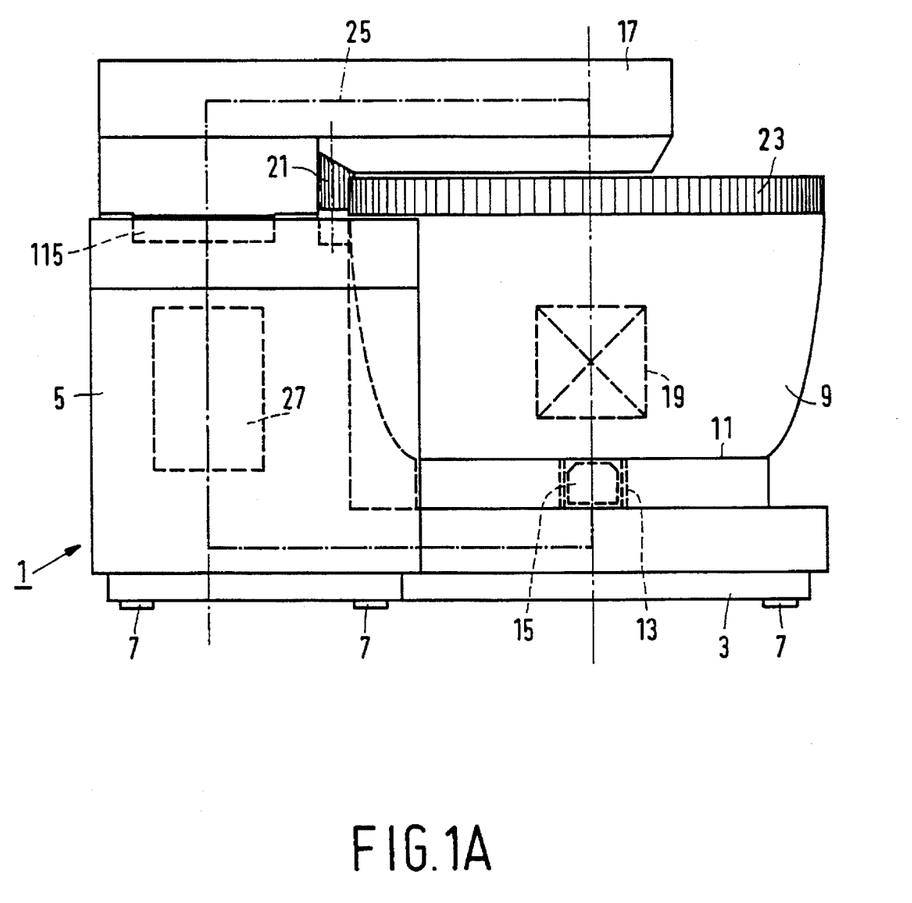
Figure 1B:
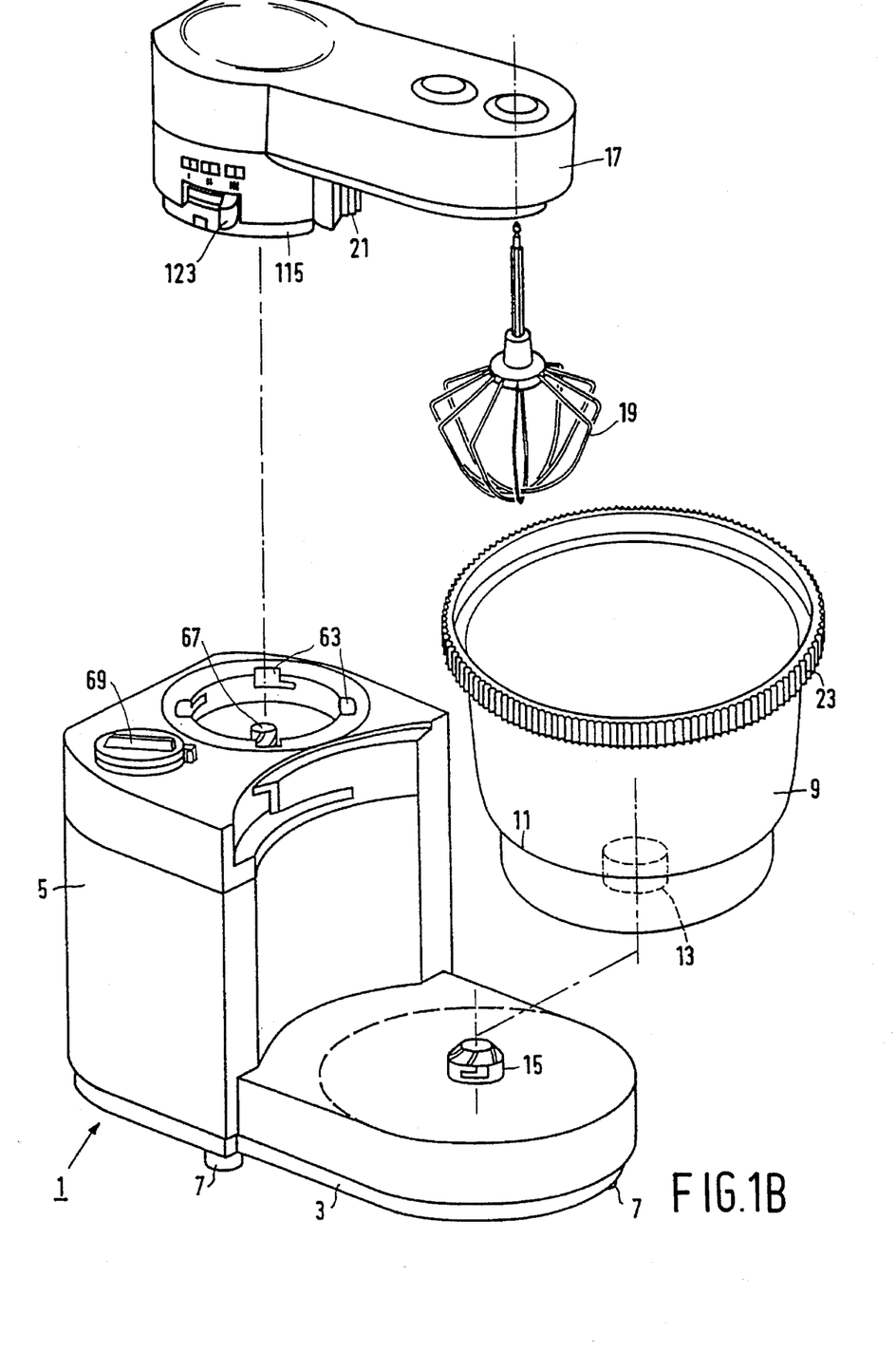
FIG. 1b shows the kitchen machine of FIG. 1a with a number of detachable components, FIG. 2a diagrammatically shows the kitchen machine of FIG. 1a in which the open bowl is replaced by a further bowl with a lid, and in which the transverse arm is replaced by a blender.

The kitchen machine shown in FIGS. 1a and 1b is provided with a synthetic resin housing 1 which comprises a base 3 and a motor housing 5 arranged on the base 3. The base 3 is provided with a number of feet 7 with which the kitchen machine can be placed on a surface. An open synthetic resin bowl 9 can be placed on the base 3 next to the motor housing 5. A bearing bush 13 by means of which the bowl 9 is rotatably supported relative to a circular-cylindrical guide 15 provided on the base 3 is arranged below a bottom 11 of the bowl 9.

As is shown in FIGS. 1a and 1b, a detachable transverse arm 17 is present on the motor housing 5 and extends substantially parallel to the base 3 above the open bowl 9. In the bowl 9 there is a rotatable tool 19 such as, for example, a mixing tool shown in FIGS. 1a and 1b, which is detachably coupled to the transverse arm 17. A pinion 21 which has its rotation bearings in the transverse arm 17 is in engagement with a toothed rim 23 provided along an outer circumference of the bowl 9. The tool 19 and the pinion 21 are coupled to a transmission 25 which is shown diagrammatically only in FIG. 1a, which is arranged in the transverse arm 17, and which can be driven by an electric motor 27 accommodated in the motor housing 5. The tool 19 can thus be rotated in the bowl 9 by the electric motor 27, while the bowl 9 is rotatable relative to the base 3 by means of the electric motor 27.

Figure 2A:
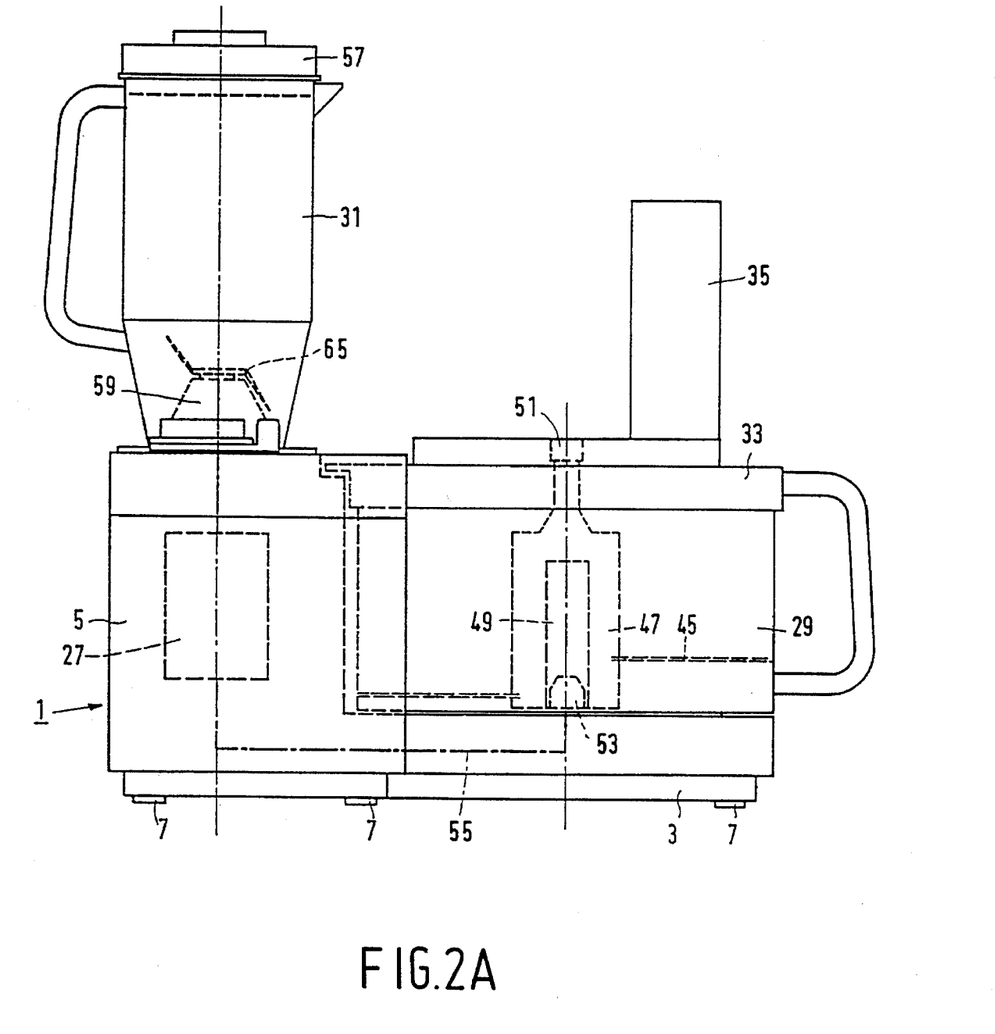
Figure 2B:
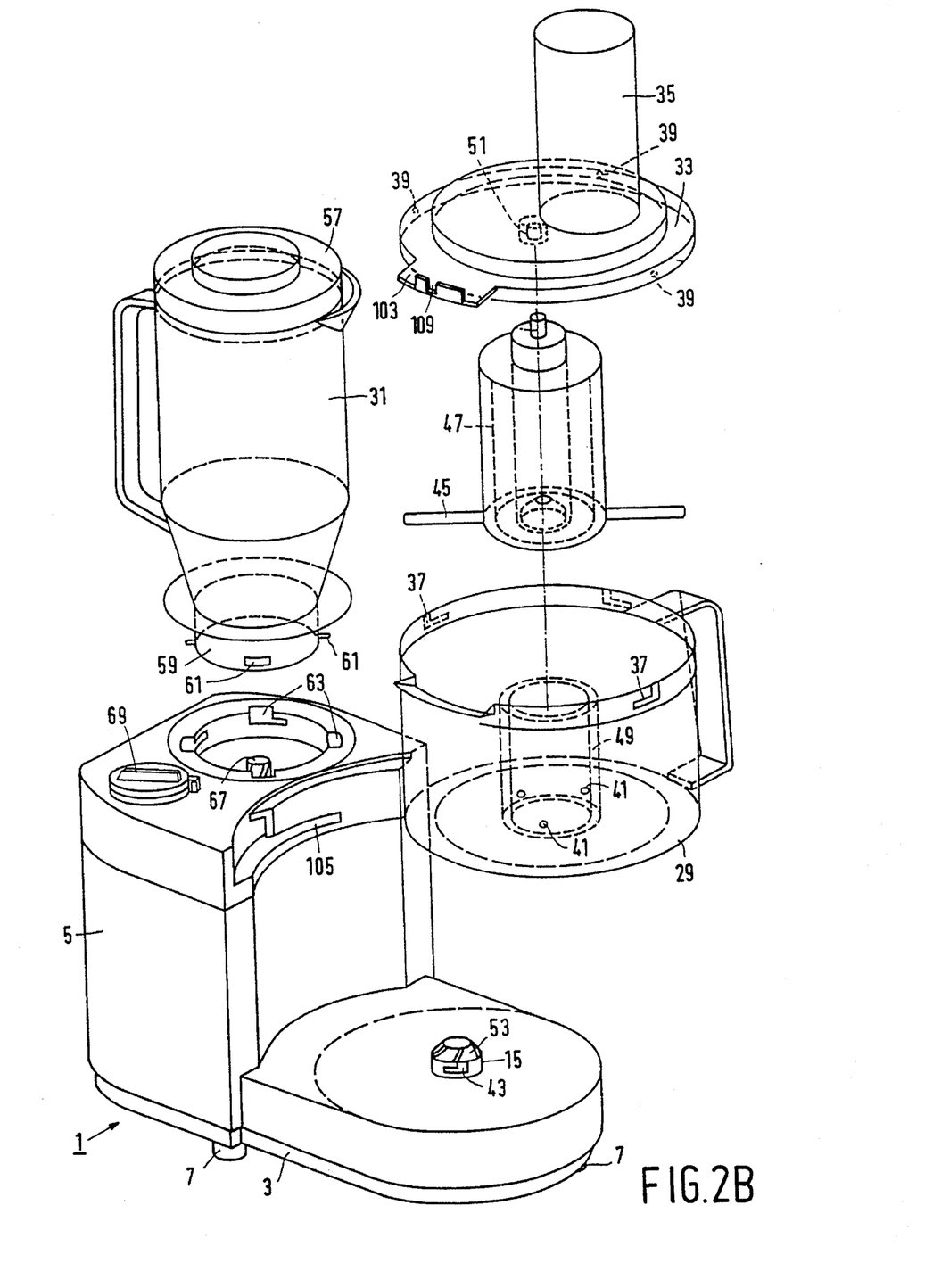
FIG. 2b shows the kitchen machine of FIG. 2a with a number of detachable components.

As is further shown in FIGS. 2a and 2b, a further transparent bowl 29 can be placed on the base 3 instead of the open bowl 9, while a transparent blender 31 can be placed on the motor housing 5 instead of the transverse arm 17, so that the kitchen machine can be used in various assemblies. The further bowl 29 can be closed with a lid 33 which is provided with a feed tube 35 and which can be locked on the further bowl 29 by means of studs 39 which cooperate with slots 37 of the further bowl 29. The further bowl 29 can be locked on the base 3 by means of studs 41 which cooperate with slots 43 provided in said guide 15. A tool 45 is rotatable in the further bowl 29, for example a cutting tool shown in FIGS. 2a and 2b, which tool can be exchanged after removal of the lid 33. The tool 45 is rotatably arranged relative to the further bowl 29 by means of a bush-shaped shaft 47 which is arranged around a central tube 49 of the further bowl 29, and a bearing bush 51 provided at the lid 33. When the further bowl 29 is placed on the base 3, the tool 45 is coupled to a first coupling bush 53 which has its rotation bearings in said guide 15 of the base 3 and can be driven by the electric motor 27 via a further transmission 55 arranged in the base 3 and shown diagrammatically only in FIG. 2a. The transparent blender 31 is provided with a lid 57 and a synthetic resin bottom part 59 which can be locked with four studs 61 in four slots 63 of the motor housing 5 cooperating with the studs 61. A tool 65, for example a mixing tool shown in FIG. 2a, has its rotation bearings in the bottom part 59 of the blender 31. In contrast to the tool 45, which can be placed in the further bowl 29, the tool 65 is held in the bottom part 59 of the blender 31 without exchange possibility. When the blender 31 is placed on the motor housing 5, the tool 65 is coupled to a second coupling bush 67 which is visible in FIG. 2b and which is rotatably arranged relative to the motor housing 5 and can also be driven by electric motor 27.

Figure 3A:
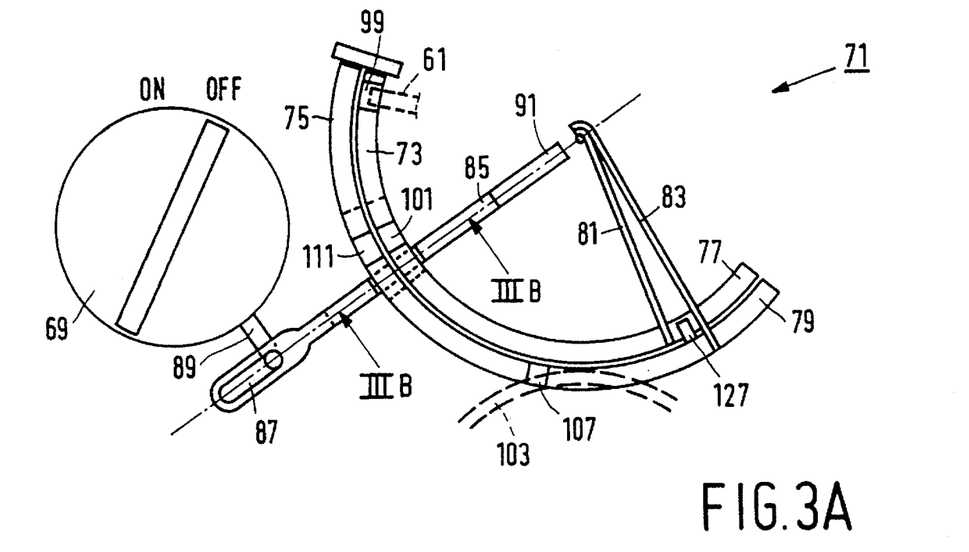
FIG. 3a shows a blocking mechanism of the kitchen machine of FIGS. 1a and 2a in a position in which the kitchen machine is switched off.
Figure 3B:
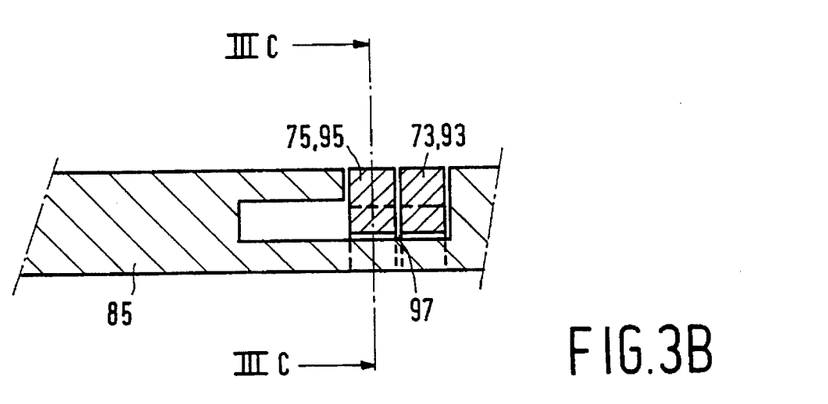
FIG. 3b is a cross-section of the blocking mechanism taken on the line IIIb—IIIb in FIG. 3a, FIG. 3c is a cross-section of the blocking mechanism taken on the line IIIc—IIIc in FIG. 3b.
Figure 3C:
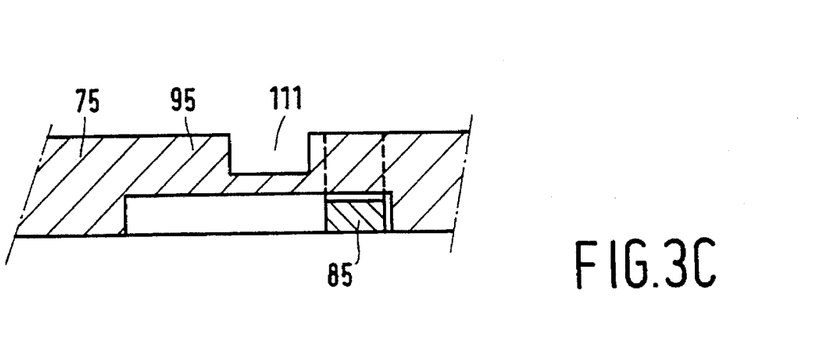
Figure 4A:
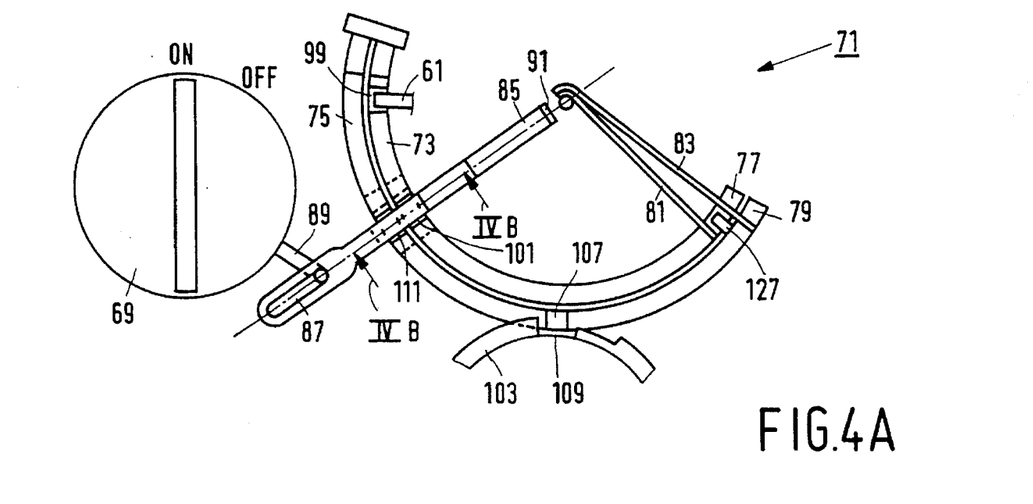
FIG. 4a shows the blocking mechanism of FIG. 3a in a position in which the kitchen machine is switched on, FIG. 4b is a cross-section of the blocking mechanism taken on the line IVb—IVb in FIG. 4a, FIG. 4c is a cross-section of the blocking mechanism taken on the line IVc—IVc in FIG. 4b.
Figure 4B:
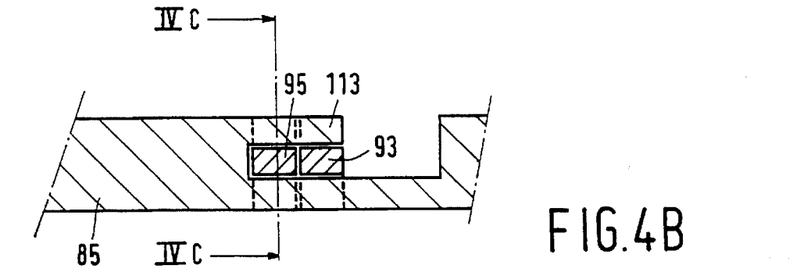
Figure 4C:
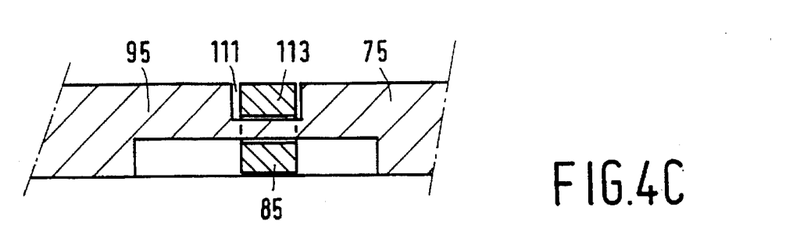

As is shown in FIGS. 1b and 2b, a rotary switch 69 with which the electric motor 27 can be switched on is present at an upper side of the motor housing 5. The kitchen machine is provided with a blocking mechanism 71 which is diagrammatically shown in FIGS. 3a and 4a and which blocks the rotary switch 69 in a zero position shown in FIG. 3a, in which the electric motor 27 is switched off, if the further bowl 29, the lid 33, or the blender 31 is absent or not correctly positioned. The blocking mechanism 71 for this purpose comprises two concentric annular slides 73 and 75 which are movably guided in two concentric annular guides 77 and 79 in the motor housing 5. When the further bowl 29 and the blender 31 are not coupled to the housing 1, the slides 73 and 75 are held in a first position shown in FIG. 3a by wire springs 81 and 83. The blocking mechanism 71 further comprises a straight slide 85 which is coupled to an arm 89 fastened to the rotary switch 69 by means of a pin-slot coupling 87. The slide 85 is movably guided in a straight guide 91 in the motor housing 5, which guide intersects the annular guides 77 and 79. As FIGS. 3b and 3c show, the annular slides 73 and 75 are provided with bridge portions 93 and 95 which in the first position of the slides 73 and 75 shown in FIG. 3a extend through a recess 97 in the slide 85 visible in FIG. 3b, so that the slide 85 is not displaceable and the rotary switch 69 is blocked in the zero position. When the blender 31 is locked on the motor housing 5, one of the studs 61 of the blender 31 comes into engagement with a recess 99 in the innermost annular slide 73, and the slide 73 is rotated by the relevant stud 61 against the pressure of the wire spring 81 into a second position shown in FIG. 4a in which a recess 101 provided in the bridge portion 93 of the slide 73 comes above the straight slide 85. When the further bowl 29 with the lid 33 is locked on the base 3, a tag 103 fastened to the lid 33 slides into a slotted opening 105 of the motor housing 5 visible in FIG. 2b. A stud 107 provided on the outermost annular slide 75 then comes into engagement with a recess 109 in the tag 103, so that the slide 75 is rotated against the pressure of the wire spring 83 into a second position shown in FIG. 4a in which a recess 111 provided in the bridge portion 95 of the slide 75 comes above the straight slide 85 (see FIG. 4c). In the second position of the annular slides 73 and 75 shown in FIG. 4a, the straight slide 85 is displaceable into a position shown in FIGS. 4a, 4b and 4c through rotation of the rotary switch 69 into a position in which the electric motor 27 is switched on. In this position of the rotary switch 69 and the slide 85, a pawl 113 fastened to the slide 85 is present in the recesses 101 and 111 of the annular slides 73 and 75 (see FIG. 4c), so that the annular slides 73 and 75 are blocked, in their second position, and the further bowl 29, the lid 33, and the blender 31 cannot be detached. As a result, not only is the rotary switch 69 blocked in the zero position if the further bowl 29, the lid 33 or the blender 31 are absent or incorrectly positioned, but also the further bowl 29, the lid 33 and the blender 31 cannot become detached while the electric motor 27 is switched on. The possibility that a user of the kitchen machine can injure himself or herself with the rotating coupling bushes 53 and 67 or with the tool 45 rotating in the further bowl 29 is thus eliminated. It is noted that instead of the blender 31 a cover plate (not shown in the Figures) may be placed on the motor housing 5, which plate is provided with studs for cooperating with the slots 63 corresponding to the studs 61 of the blender 31. The kitchen machine may also be used while only the further bowl 29 with lid 33 has been placed through the placement of said cover plate.

Figure 5:
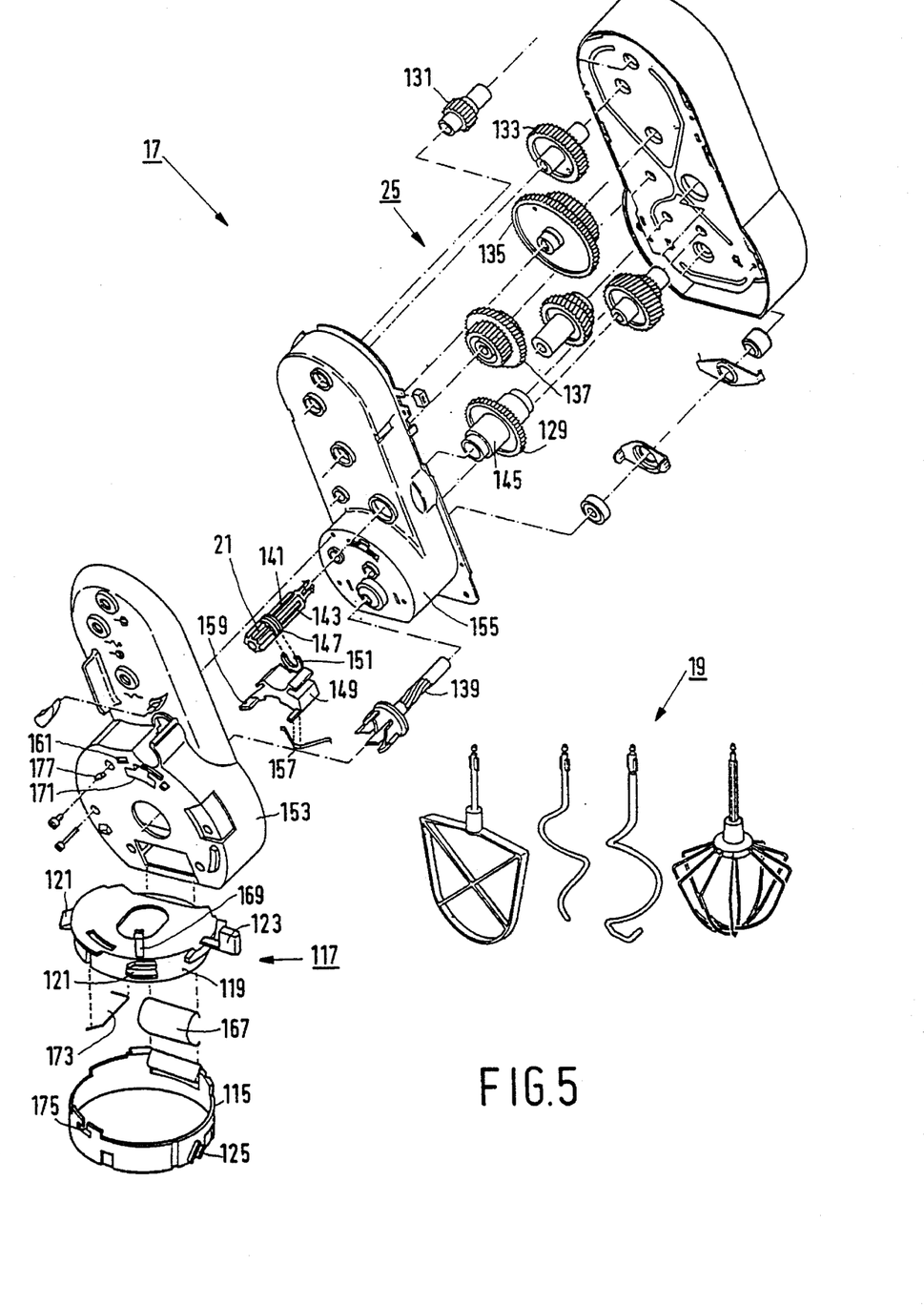
FIG. 5 shows a number of components of the transverse arm of the kitchen machine of FIG. 1a, FIG. 6a shows a first position of a pinion by which the bowl of the kitchen machine of FIG. 1a can be driven.

As FIGS. 1a and 1b show, the transverse arm 17 comprises a coupling piece 115 with which the transverse arm can be locked relative to the motor housing 5. As FIG. 5 shows the coupling piece 115 for this purpose comprises a locking mechanism 117 which is provided with a locking disc 119 arranged so as to be rotatable relative to the coupling piece 115. The locking disc 119 comprises four studs 121 which are capable of cooperating with the four slots 63 of the motor housing 5 and can be displaced by a user of the kitchen machine by means of a button 123 from a first position, in which the transverse arm 17 is unlocked from the motor housing 5, into a second position, in which the transverse arm 17 is locked to the motor housing 5.

The coupling piece 115 and the locking mechanism 117 are capable of cooperating with the blocking mechanism 71 described above. The coupling piece 115 for this purpose comprises an oblique slot 125 visible in FIG. 5 which comes into engagement with a stud 127 provided on an inside of the outermost annular slide 75 (see FIGS. 3a and 4a) upon the placement of the transverse arm 17 on the motor housing 5, so that the outermost slide 75 of the blocking mechanism 71 is moved from the first into the second position. Furthermore, one of the studs 121 of the locking disc 119 cooperates with the recess 99 in the innermost annular slide 73 shown in FIGS. 3a and 4a in the same manner as the corresponding stud 61 of the blender 31, whereby the innermost slide 73 of the blocking mechanism 71 is moved from the first into the second position through displacement of the locking disc 119 from the first into the second position. As a result, the blocking mechanism 71 does not release the rotary switch 69 until the transverse arm 17 has been positioned and locked correctly on the motor housing 5. Additionally, the transverse arm 17 cannot be detached from the motor housing 5 while the electric motor 27 is switched on.

As FIG. 5 further shows, the pinion 21 is coupled to a gear 129 belonging to the transmission 25. A number of gears 131, 133, 135 and 137 also belong to the transmission 25, to which various mixing, stirring, and kneading tools 19 can be coupled, as well as a coupling shaft 139 which can be coupled to the second coupling bush 67 upon the placement of the transverse arm 17 on the motor housing 5. The pinion 21 and the tools 19 can thus be driven by the electric motor 27 via the transmission 25.

Figure 6A:
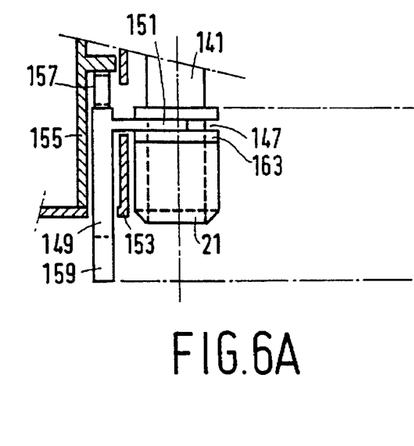
Figure 6B:
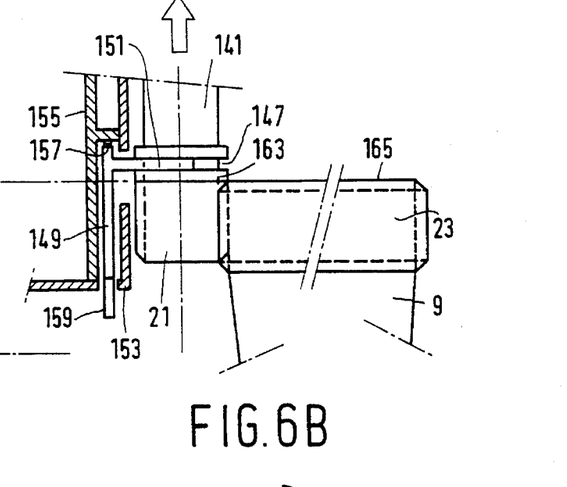

As FIG. 5 further shows, a shaft 141 of the pinion 21 is provided with a number of axial grooves 143 which are in engagement with a number of projections (not visible in the Figure) in a bush 145 of the gear 129. The pinion 21 as a result is slidable in axial direction relative to the gear 129. As is visible in FIGS. 5 and 6, the pinion 21 is further provided along a circumference with a groove 147 which is in engagement with a fork 151 belonging to a slide 149. The slide 149 is displaceably guided between a lower outer shell 153 and a transmission frame 155 of the transverse arm 17 in a direction parallel to the axis of rotation of the pinion 21. When the pinion 21 is not in engagement with the toothed rim of the bowl 9, the pinion 21 and the slide 149 are in a first position shown in FIG. 6a under pretension of a blade spring 157 which is shown in FIGS. 5 and 6 and which is arranged between the slide 149 and the transmission frame 155. In the first position of the pinion 121 and the slide 149, a blocking stud 159 belonging to the slide 149 extends through an opening 161 shown in FIG. 5 to beyond the lower outer shell 153. When the transverse arm 17 is placed on the motor housing 5 while the rotatable bowl 9 is not present on the base 3, the blocking stud 159 blocks one of the studs 121 of the locking disc 119, so that the locking disc 119 cannot be moved into the second position and the transverse arm 17 cannot be locked to the motor housing 5. When the transverse arm 17 is placed on the motor housing 5 while the rotatable bowl 9 has been placed correctly on the base 3, the pinion 21 comes into engagement with the toothed rim 23 of the bowl 9. A collar 163 provided along a circumference of the pinion 21 then comes into pressure contact with a flank 165 of the toothed rim 23, so that the pinion 21 and the slide 149 are displaced parallel to the axis of rotation of the pinion 31 against the spring force of the blade spring 157 from the first position into a second position shown in FIG. 6b. The displacement of the slide 149 into the second position causes the blocking stud 159 to release the locking disc 119, so that the locking disc 119 can be moved into the second position in which the blocking mechanism 71 release the rotary switch 69.

Figure 7A:
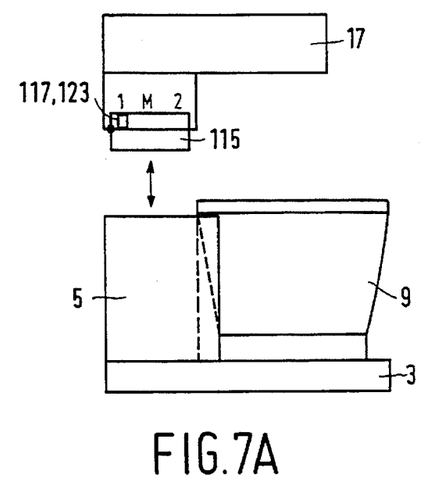
Figure 7B:
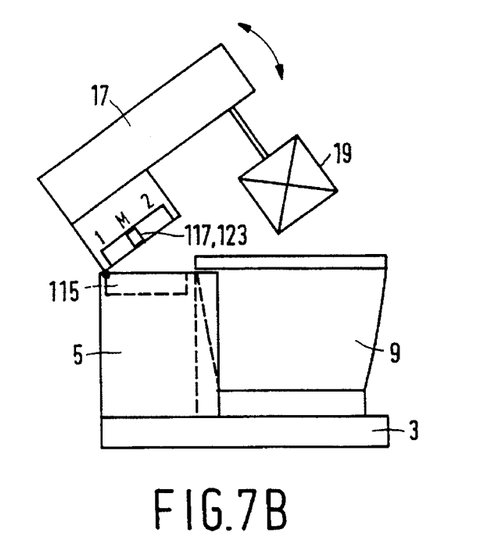

As FIG. 7b shows, the transverse arm 17 can pivot relative to the motor housing 5. The transverse arm 17 is for this purpose provided with an elastic blade hinge 167 shown in FIG. 5 by means of which the lower outer shell 153 is fastened to the coupling piece 115. As FIG. 5 further shows, the locking disc 119 is provided with a hook 169 capable of cooperating with a T-shaped recess 171 provided in the lower outer shell 153. The transverse arm 17 is locked relative to the coupling piece 115 in the first and second position of the locking disc 119 through engagement of the hook 169 in the recess 171, while the hook 169 releases the transverse arm 17 from the coupling piece 115 in an intermediate position of the locking disc 119 which is situated between the first and the second position and in which the coupling piece 115 is locked to the motor housing 5, as is the case in the second position of the locking disc 119. When the transverse arm 17 is pivoted relative to the coupling piece 115 with the locking disc 119 in the intermediate position, an end of a wire spring 173 shown in FIG. 5 and fastened to a lower side of the locking disc 119 is present in the vertical leg of a T-shaped recess 175 in the coupling piece 115, so that the locking disc 119 is blocked relative to the coupling piece 115 in the intermediate position. When the transverse arm 17 is pivoted towards the coupling piece 115, the wire spring 173 is elastically deformed by a stud 177 provided at the lower outer shell 153 and pressed into the horizontal portion of the T-shaped recess 175, so that the locking disc 119 is displaceable into the first or second position in which the transverse arm 17 is unlocked from or locked to the coupling piece 115, respectively. It is noted that the innermost annular slide 73 of the blocking mechanism 71 is not in the second position when the locking disc 119 is in the intermediate position, so that the rotary switch 69 is blocked when the transverse arm 17 is pivoted relative to the motor housing 5.

The operation and the advantages of the above locking mechanism 117 of the transverse arm 17 cooperating with the blocking mechanism 71 will now be briefly summarized. In the first position of the locking mechanism 117 shown in FIG. 7a, the transverse arm 17 is locked relative to the coupling piece 115 by the hook 169, while the transverse arm 17 with the coupling piece 115 can be removed from the motor housing 5. The rotary switch 69 is blocked in the zero position by the blocking mechanism 71 cooperating with the locking mechanism 117, so that the electric motor 27 cannot be switched on and a user of the kitchen machine cannot be injured by the rotating coupling bush 67 or 53.

In the intermediate position of the locking mechanism 117 shown in FIG. 7b, the coupling piece 115 of the transverse arm 17 is locked to the motor housing 5, while the hook 169 releases the transverse arm 17 relative to the coupling piece 115, so that the transverse arm 17 is pivotable relative to the coupling piece 115 and the motor housing 5. In the pivoted position of the transverse arm 17 shown in FIG. 7b, the tool 19 may be exchanged or cleaned, and the bowl 9 may be placed or removed. In the intermediate position of the locking mechanism 117 the rotary switch 69 is again blocked in the zero position by the blocking mechanism 71 which cooperates with the locking mechanism 117. In the pivoted position of the transverse arm 17, the locking mechanism 117 is also blocked in the intermediate position by the wire spring 173, so that the electric motor 27 cannot be switched on through rotation of the locking mechanism 117 into its second position while the transverse arm 17 is in the pivoted position, and the transverse arm 17 and the coupling piece 115 cannot be detached from the motor housing 5 through rotation of the locking mechanism 117 into the first position.

When the bowl 9 is not placed on the base 3 or is incorrectly placed on the base 3, the locking mechanism 117 cannot be brought from the intermediate position into the second position when the transverse arm 17 has not been pivoted, because the pinion 21 is in the first position. The rotary switch 69 then remains blocked in the zero position by the blocking mechanism 71, so that a user of the kitchen machine cannot be injured by the rotating first coupling bush 53 or the rotating tool 19, if the bowl 9 was not placed, or an incorrect operation of the kitchen machine is prevented in the case in which the bowl 9 was placed incorrectly on the base 3. The pinion 21 thus has a dual function since the pinion 21 serves both as a drive wheel for the rotatable bowl 9 and as a mechanical presence detector for the bowl 9. A simple and effective construction of the kitchen machine with a minimum number of components is thus achieved thereby.

Figure 7C:
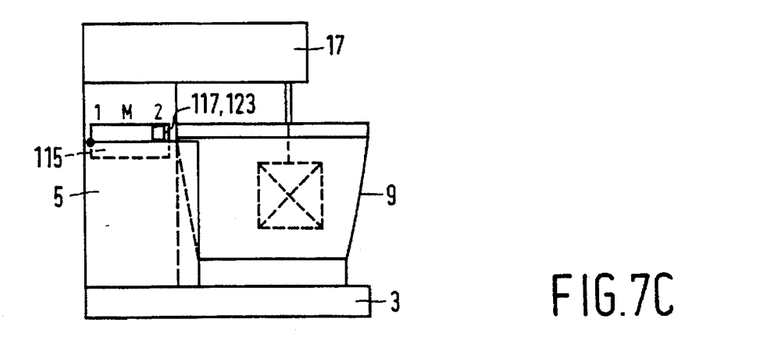

When the bowl 9 has been correctly placed on the base 3 and the transverse arm 17 is not pivoted relative to the motor housing 5, the pinion 21 is in the second position and the locking mechanism 117 can be moved into the second position shown in FIG. 7c. Only in this position in which both the bowl 9 and the transverse arm 17 are locked relative to the housing 1, does the blocking mechanism 71 release the rotary switch 69 so that the electric motor 27 can be switched on. The four studs 121 of the locking disc 119 provide a rigid and stable locking of the transverse arm 17 to the motor housing 5 in this case. When the electric motor 27 has been switched on with the locking mechanism 117 in the second position, the locking mechanism 117 is blocked in the second position by the blocking mechanism 71, so that it is not possible with the electric motor 27 switched on to pivot or detach the transverse arm 17 through rotation of the locking mechanism 117 into the intermediate or first position.

The kitchen machine described above comprises a motor housing 5 which is arranged on a base 3 and in which an electric motor 27 is present, while the bowl 9 can be placed next to the motor housing 5. It is noted that the invention is also applicable to kitchen machines of a different construction such as, for example, a kitchen machine in which the transmission can be driven by the electric motor of a handmixer which can be placed on the transverse arm. The invention is also applicable to a kitchen machine having a transverse arm which cannot pivot but can be removed, or which can pivot but cannot be removed.

It is further noted that a different type of drive wheel may be used instead of the pinion 21 such as, for example, a friction wheel which during operation bears on a smooth outer circumference of the bowl. The pinion 21 may alternatively drive the bowl 9 by means of a toothed rim provided along an inner circumference of the bowl 9. An axial displacement of the pinion 21 through engagement with the toothed rim 23 may also take place by an alternative method such, for example, the use of a conical pinion and a bevel gear rim.

It is finally noted that instead of the blocking mechanism 71 described above an alternative blocking mechanism for blocking the switch may be used. The blocking mechanism 71 is a dual blocking mechanism because the kitchen machine can be used simultaneously with the further bowl 29 and the blender 31. In a kitchen machine which can be used exclusively with the transverse arm and rotating bowl or exclusively with a further bowl, the blocking mechanism may be a single blocking mechanism. Moreover, instead of the pinion 21 which cooperates with the blocking mechanism 71 via the locking mechanism 117 of the transverse arm 17, a pinion or alternative drive wheel may be used which cooperates directly with the blocking mechanism of the switch.

We claim:

1. A kitchen machine which comprises a housing, a bowl which is placeable on the housing and which is rotatably guided relative to the housing, a transverse arm which is displaceable relative to the housing, a tool which is placeable in the bowl and can be coupled to a transmission arranged in the transverse arm and driven by an electric motor, and a drive wheel driven by the electric motor for driving the bowl and cooperating with a circumference of the bowl, wherein the drive wheel is displaceably guided along its axis of rotation relative to the transverse arm between a first position and a second position, the drive wheel being displaceable from the first position into the second position through engagement with the bowl when the transverse arm is placed on the housing, and a blocking mechanism cooperating with the drive wheel blocks a switch of the electric motor in the first position of the drive wheel and releases it in the second position of the drive wheel.

2. A kitchen machine as claimed in claim 1, in which the drive wheel is a pinion which cooperates with a toothed rim provided along the circumference of the bowl, the pinion being provided with a collar which comes into contact with a flank of the toothed rim when the transverse arm is placed on the housing.

3. A kitchen machine as claimed in claim 1, wherein the drive wheel is provided with a slot along a circumference, which slot is in engagement with a fork belonging to a slide which is displaceable parallel to the axis of rotation of the drive wheel and is provided with a blocking stud which cooperates with the blocking mechanism.

4. A kitchen machine as claimed in claim 1, wherein the transverse arm is provided with a locking mechanism which cooperates with the blocking mechanism and the displaceable drive wheel and which is displaceable from a first position, in which the transverse arm is disconnected from the housing, into a second position, in which the transverse arm is locked relative to the housing, the blocking mechanism blocking the switch of the electric motor in the first position of the locking mechanism and releasing it in the second position of the locking mechanism.

5. A kitchen machine as claimed in claim 4, wherein the locking mechanism comprises a rotatable locking disc which is provided with studs which cooperate with mating slots in the housing.

6. A kitchen machine as claimed in claim 4 wherein in that the transverse arm is pivotable relative to a coupling piece which comprises the locking mechanism and with which the transverse arm can be locked relative to the housing, while a hook belonging to the locking mechanism locks the transverse arm relative to the coupling piece in the first and second position of the locking mechanism, and releases the transverse arm relative to the coupling piece in an intermediate position of the locking mechanism which lies between the first and the second position.

7. A kitchen machine as claimed in claim 6, wherein in the blocking mechanism cooperating with the locking mechanism blocks the switch in the intermediate position of the locking mechanism.

8. A kitchen machine as claimed in claim 6 wherein the pivotable transverse arm cooperates with a further blocking element which blocks the locking mechanism in the intermediate position when the transverse arm is pivoted relative to the coupling piece.

9. A kitchen machine as claimed in claim 8, wherein the further blocking element is a wire spring which is elastically deformed by the transverse arm and releases the locking mechanism when the transverse arm is locked relative to the coupling piece, the wire spring being released and blocking the locking mechanism in the intermediate position when the transverse arm is pivoted relative to the coupling piece.

10. A kitchen machine as claimed in claim 4, wherein the blocking mechanism blocks the locking mechanism in the second position when the electric motor has been switched on by means of the switch.

11. A kitchen machine as claimed in claim 2 wherein the drive wheel is provided with a slot along a circumference, which slot is engaged with a fork belonging to a slide which is displaceable parallel to the axis of rotation of the drive wheel and is provided with a blocking stud which cooperates with the blocking mechanism.

12. A kitchen machine as claimed in claim 2, wherein the transverse arm is provided with a locking mechanism which cooperates with the blocking mechanism and the displaceable drive wheel and which is displaceable from a first position, in which the transverse arm is disconnected from the housing, into a second position, in which the transverse arm is locked relative to the housing, the blocking mechanism blocking the switch of the electric motor in the first position of the locking mechanism and releasing it in the second position of the locking mechanism.

13. A kitchen machine as claimed in claim 3, wherein the transverse arm is provided with a locking mechanism which cooperates with the blocking mechanism and the displaceable drive wheel and which is displaceable from a first position, in which the transverse arm is disconnected from the housing, into a second position, in which the transverse arm is locked relative to the housing, the blocking mechanism blocking the switch of the electric motor in the first position of the locking mechanism and releasing it in the second position of the locking mechanism.

14. A kitchen machine as claimed in claim 5, wherein the transverse arm is pivotable relative to a coupling piece which comprises the locking mechanism and with which the transverse arm can be locked relative to the housing, while a hook belonging to the locking mechanism locks the transverse arm relative to the coupling piece in the first and second position of the locking mechanism, and releases the transverse arm relative to the coupling piece in an intermediate position of the locking mechanism which lies between the first and the second position.

15. A kitchen machine as claimed in claim 7, wherein the pivotable transverse arm cooperates with a further blocking element which blocks the locking mechanism in the intermediate position when the transverse arm is pivoted relative to the coupling piece.

16. A kitchen machine as claimed in claim 5, wherein the blocking mechanism blocks the locking mechanism in the second position when the electric motor has been switched on by means of the switch.

17. A kitchen machine as claimed in claim 6, wherein the blocking mechanism blocks the locking mechanism in the second position when the electric motor has been switched on by means of the switch.

18. A kitchen machine as claimed in claim 7, wherein the blocking mechanism blocks the locking mechanism in the second position when the electric motor has been switched on by means of the switch.

19. A kitchen machine as claimed in claim 8, wherein the blocking mechanism blocks the locking mechanism in the second position when the electric motor has been switched on by means of the switch.

20. A kitchen machine as claimed in claim 9, wherein the blocking mechanism blocks the locking mechanism in the second position when the electric motor has been switched on by means of the switch.

* * * * *